(12) United States Patent
Van Bergen et al.

(10) Patent No.: US 11,027,411 B2
(45) Date of Patent: Jun. 8, 2021

(54) SAW STAND

(71) Applicant: TTI (MACAO COMMERCIAL OFFSHORE) LIMITED, Macau (MO)

(72) Inventors: Jonathan R. Van Bergen, Easley, SC (US); Andrew Kinnison, Simpsonville, SC (US); Richmond Angeles, Seneca, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 294 days.

(21) Appl. No.: 16/169,237

(22) Filed: Oct. 24, 2018

(65) Prior Publication Data

US 2020/0130168 A1 Apr. 30, 2020

(51) Int. Cl.
*B25H 1/00* (2006.01)
*B23D 47/02* (2006.01)
*B25H 1/04* (2006.01)

(52) U.S. Cl.
CPC ......... *B25H 1/0042* (2013.01); *B23D 47/025* (2013.01); *B25H 1/04* (2013.01)

(58) Field of Classification Search
CPC ....... B25H 1/0042; B25H 1/04; B23D 47/025
See application file for complete search history.

(56) References Cited

U.S. PATENT DOCUMENTS

| | | | |
|---|---|---|---|
| 3,931,751 A | 1/1976 | Simonson | |
| 4,269,096 A | 5/1981 | Boone | |
| 4,726,405 A | 2/1988 | Bassett | |
| 4,860,807 A | 8/1989 | Vacchiano | |
| 4,969,496 A * | 11/1990 | Romans | B23D 47/025 108/132 |
| 5,067,535 A | 11/1991 | Wolff | |
| 6,345,829 B1 | 2/2002 | Mueller | |
| 6,360,797 B1 * | 3/2002 | Brazell | B23D 47/025 144/286.1 |
| 6,578,856 B2 | 6/2003 | Kahle | |
| 6,886,836 B1 | 5/2005 | Wise | |
| 6,942,229 B2 | 9/2005 | Brazell et al. | |
| 7,077,421 B2 | 7/2006 | Wu | |

(Continued)

FOREIGN PATENT DOCUMENTS

| | | |
|---|---|---|
| CN | 203993824 U | 12/2014 |
| EP | 1925406 A1 | 5/2008 |

(Continued)

OTHER PUBLICATIONS

European Patent Office Extended Search Report for Application No. 19205108.4 dated Mar. 12, 2020 (7 pages).

*Primary Examiner* — Brian L Swenson
(74) *Attorney, Agent, or Firm* — Michael Best & Friedrich LLP

(57) ABSTRACT

A saw stand includes a table having a saw support surface, a plurality of legs pivotally coupled to the table, the legs movable relative to the table to define a first configuration, a second configuration, and a third configuration of the saw stand, and a latch mechanism. The latch mechanism includes a latch element movable between a latched position and an unlatched position. The latch mechanism is configured to inhibit movement of each of the legs relative to the table when the latch element is in the latched position and the saw stand is in the third configuration.

19 Claims, 13 Drawing Sheets

(56) References Cited

U.S. PATENT DOCUMENTS

| | | | |
|---|---|---|---|
| 7,448,608 B2 * | 11/2008 | Radermacher | B23D 47/025 144/267 |
| 7,458,403 B2 * | 12/2008 | Radermacher | B23D 47/025 144/286.1 |
| 7,819,111 B2 | 10/2010 | Wise | |
| 8,096,519 B2 | 1/2012 | Tam et al. | |
| 8,517,067 B2 | 8/2013 | Barnhill | |
| 9,186,736 B1 | 11/2015 | Chang | |
| 2004/0187666 A1 | 9/2004 | Huang | |
| 2004/0250901 A1 | 12/2004 | Ursell et al. | |
| 2007/0012826 A1 | 1/2007 | Liu et al. | |
| 2008/0196632 A1 | 8/2008 | Achterberg et al. | |
| 2010/0213148 A1 | 8/2010 | Chen | |

FOREIGN PATENT DOCUMENTS

| | | |
|---|---|---|
| EP | 2335883 A2 | 6/2011 |
| EP | 2644303 A1 | 10/2013 |

* cited by examiner

SAW STAND

FIELD OF THE INVENTION

The present invention relates to saw stands.

BACKGROUND OF THE INVENTION

Some types of saws, such as miter saws and table saws, may be supported on saw stands. Saw stands provide a stable support surface for supporting the saw at a convenient operating height. Different types of saws may require saw stands of different heights. For example, a miter saw typically has a relatively short base because the motor and blade are supported on an arm above the base. Accordingly, miter saws are typically supported on relatively tall saw stands to position the work surface of the miter saw at a convenient operating height. In contrast, a portable table saw has a relatively tall base because the motor and blade are provided within the base. Accordingly, table saws are typically supported on shorter saw stands to position the work surface of the table saw at a convenient height.

SUMMARY OF THE INVENTION

The present invention provides, in one aspect, a saw stand including a table having a saw support surface, a plurality of legs pivotally coupled to the table, the legs movable relative to the table to define a first configuration, a second configuration, and a third configuration of the saw stand, and a latch mechanism. The latch mechanism includes a latch element movable between a latched position and an unlatched position. The latch mechanism is configured to inhibit movement of each of the legs relative to the table when the latch element is in the latched position and the saw stand is in the third configuration.

The present invention provides, in another aspect, a saw stand including a table having a saw support surface, a plurality of legs pivotally coupled to the table, the legs pivotable relative to the table to define a first configuration in which the legs extend perpendicular to the saw support surface, a second configuration in which the legs extend at oblique angles relative to the saw support surface, and a third configuration in which the legs extend parallel to the support surface, and a latch mechanism including a latch element movable between a latched position and an unlatched position. The latch mechanism is configured to inhibit movement of each of the legs relative to the table when the latch element is in the latched position and the saw stand is in the third configuration.

The present invention provides, in another aspect, a saw stand including a table having a saw support surface and a plurality of legs pivotally coupled to the table. The plurality of legs includes a first leg and a second leg, each pivotable about a first axis, and the plurality of legs further includes a third leg and a fourth leg, each pivotable about a second axis parallel to the first axis. The saw stand also includes a base frame extending from the third and fourth legs, a plurality of wheels coupled to the base frame or the third and fourth legs, and a latch mechanism including a latch element movable along the table, a first pin extending from the first leg, and a second pin extending from the third leg. The saw stand is configurable in a first configuration in which the saw support surface is positioned at a first height. The saw stand is configurable in a second configuration in which the saw support surface is positioned at a second height lower than the first height. The saw stand is configurable in a third configuration in which the saw support surface extends perpendicular to the base frame. The latch element is engageable with the first pin and the second pin to selectively retain the saw stand in the third configuration.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
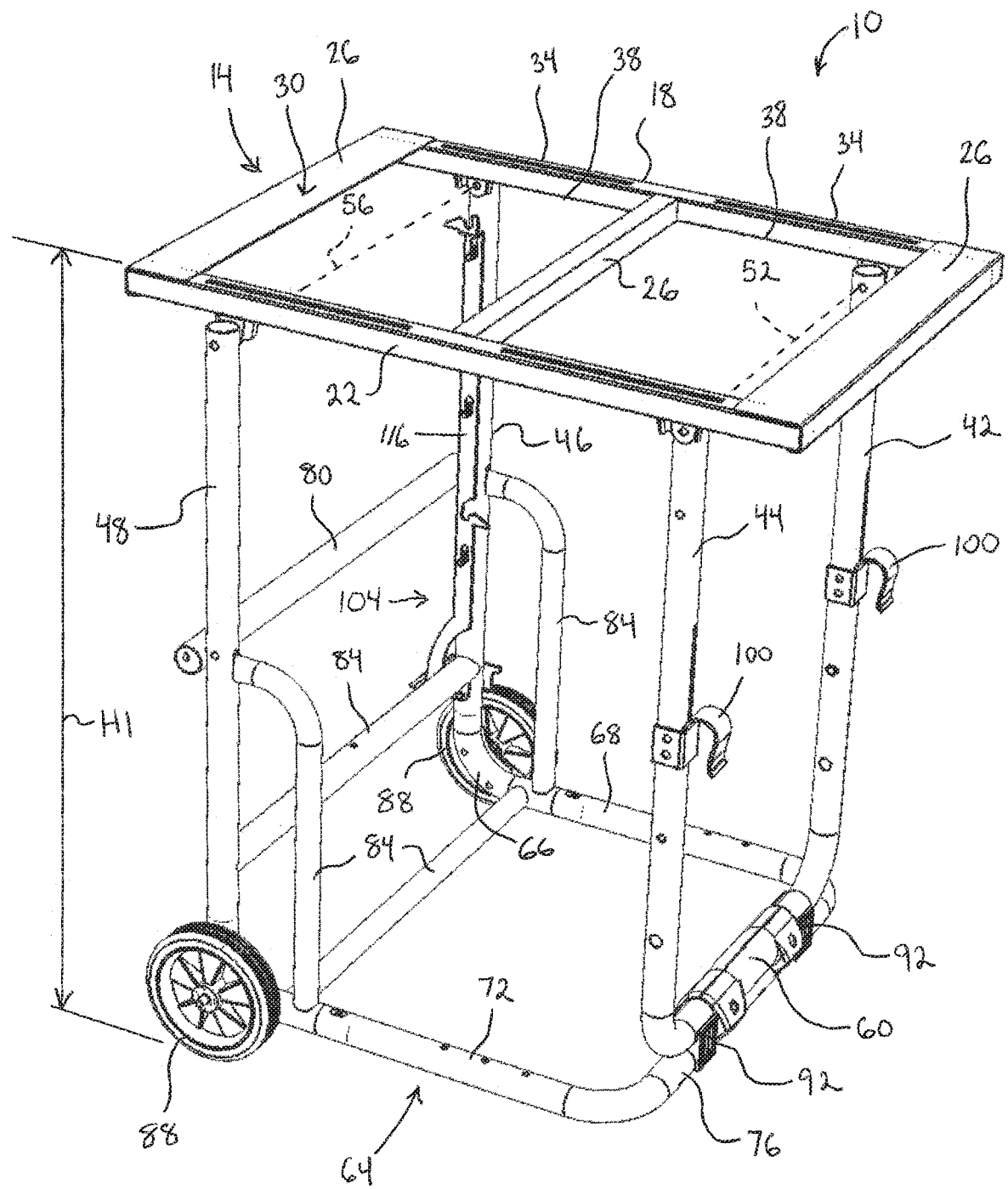
FIG. 1 is a perspective view of a saw stand according to one embodiment, positioned in a miter saw stand configuration.

FIGS. 1-8 illustrate a saw stand 10 according to an embodiment of the invention. The saw stand 10 includes a table 14 with first and second side rails 18, 22 and a plurality of cross rails 26 extending between the side rails 18, 22 (FIG. 1). A table top (not shown) is fixed to the side rails 18, 22 and the cross rails 26. The table top includes a generally planar saw support surface 30 particularly sized and shaped for supporting a saw thereon. For example, in the illustrated embodiment, the saw support surface 30 is sized and shaped to support standard sized miter saws and portable table saws. The table 14 is not so limited in use, however, and may also or alternatively be configured to support other types of tools, workpieces, and the like. In some embodiments, the table top may be omitted, and the saw support surface 30 may be collectively defined by the top sides of the side rails 18, 22 and cross rails 26.

The illustrated side rails 18, 22 include slots 34 that can receive fasteners to securely couple a particular saw to the table 14. In other embodiments, any other configuration of slots, holes, fasteners, projections, and the like may be provided to facilitate attaching a saw to the table 14. The table 14 includes gaps or openings 38 between adjacent cross rails 26, which advantageously reduces the weight and cost of the saw stand 10.

With continued reference to FIG. 1, the saw stand 10 further includes first, second, third, and fourth legs, 42, 44, 46, 48, each pivotally coupled to one of the side rails 18, 22. In particular, the first and third legs 42, 46 are pivotally coupled to the first side rail 18, and the second and fourth legs are pivotally coupled to the second side rail 22. The first and second legs 42, 44 are pivotable relative to the table 14 about a first axis 52, and the third and fourth legs 46, 48 are pivotable relative to the table 14 about a second axis 56 that is parallel to the first axis 52.

A connecting member 60 spans between the distal (relative to the table) ends of the first and second legs 42, 44, such that the legs 42, 44 and the connecting member 60 collectively form a U-shape. A base frame 64 is coupled to the distal ends of the third and fourth legs 46, 48 via curved transition members 66. The base frame 64 includes first and second frame members 68, 72 and a connecting frame member 76 that spans between the first and second frame members 68, 72, such that the frame members 68, 72 and the connecting frame member 76 collectively form a U-shape. In some embodiments, a tray or platform (not shown) may extend across the base frame 64 between the first and second frame members 68, 72. The first and second frame members 68, 72 extend perpendicular to the third and fourth legs 46, 48, such that the third and fourth legs 46, 48 and the base frame 64 collectively form an L-shape.

In the illustrated embodiment, the saw stand 10 further includes a cross member 80 and various reinforcing members 84. The cross member 80 extends between the third and fourth legs 46, 48, proximate their longitudinal midpoints. The reinforcing members 84 interconnect the third and fourth legs 46, 48 with the base frame 64, increasing the strength and rigidity of the third and fourth legs 46, 48 and the base frame 64. A pair of wheels 88 is coupled to the base frame 64 or the legs 46, 48 proximate the distal ends of the third and fourth legs 46, 48. In the illustrated embodiment, the wheels 88 are directly coupled to the transition members 66 and are thus coupled to the base frame 64 and the legs 46, 48 via the transition members 66. In other embodiments, the wheels 88 may be directly coupled to the base frame 64 or to the legs 46, 48. The wheels 88 may facilitate moving the saw stand 10, but may be omitted in other embodiments.

Figure 5:
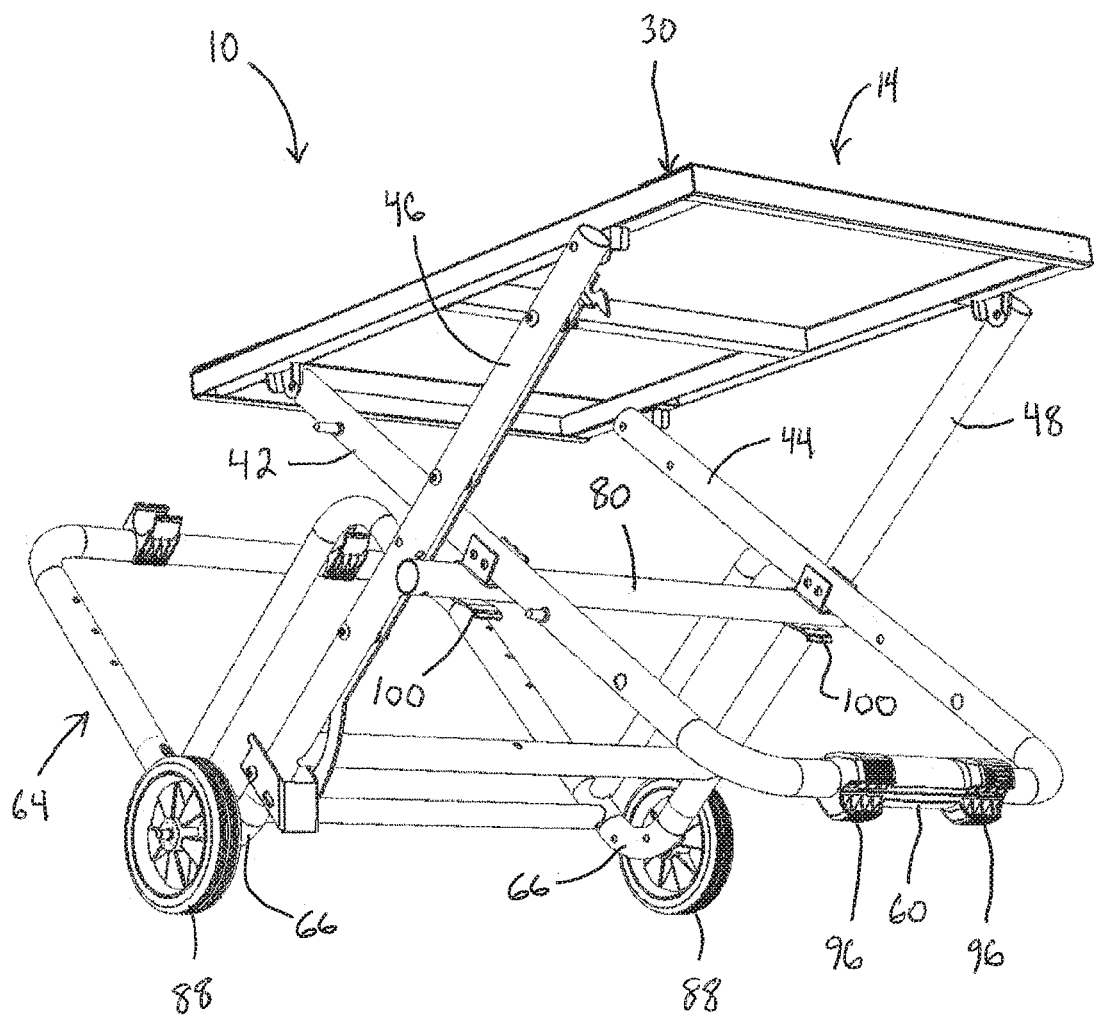
FIG. 5 is another perspective view of the saw stand of FIG. 1 in the table saw stand configuration.
Figure 6:
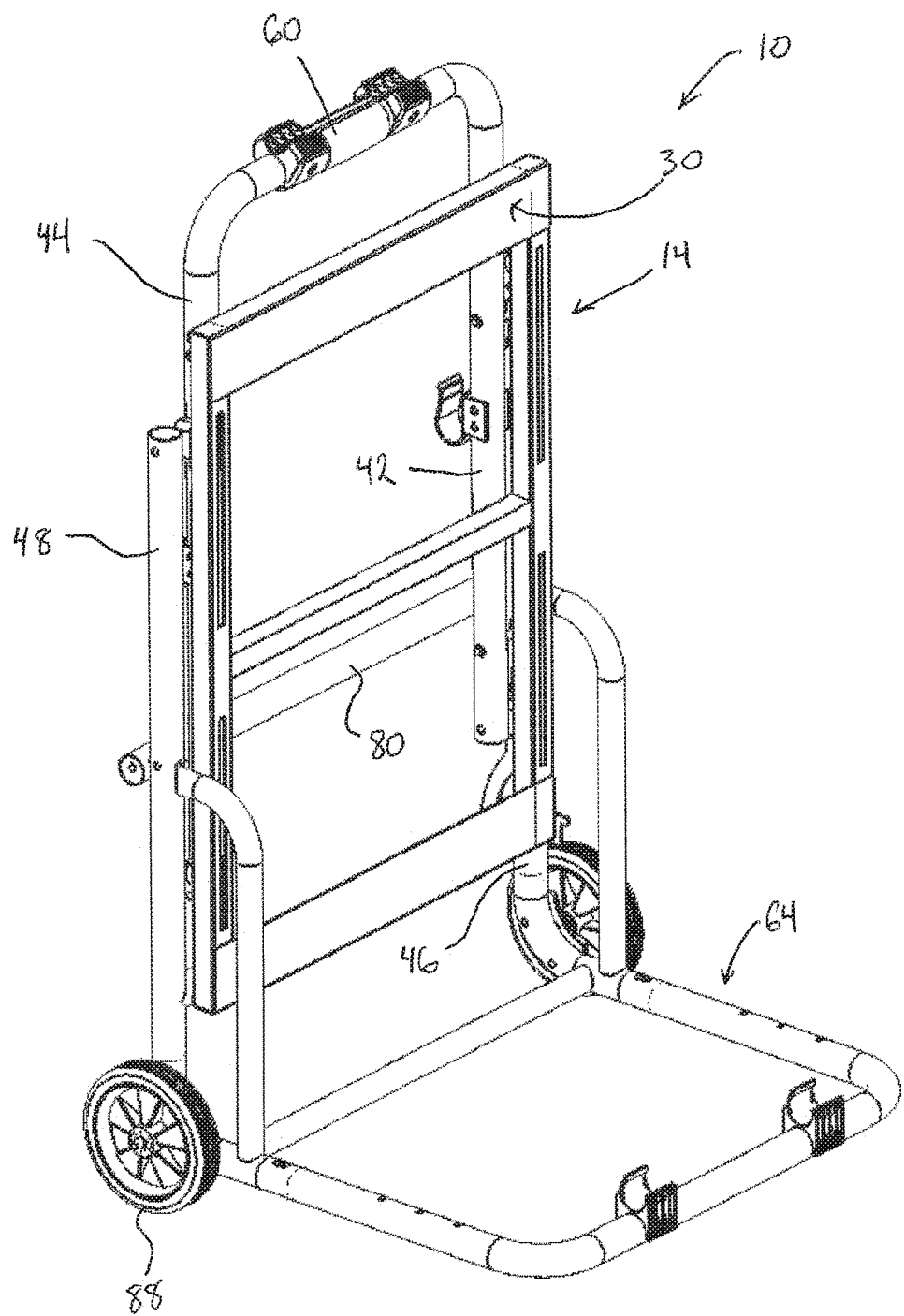
FIG. 6 is a perspective view of the saw stand of FIG. 1 in a transport configuration.

The illustrated saw stand 10 is configurable in a first or miter saw stand configuration (FIG. 1), a second or table saw configuration (FIGS. 3-5), and a third or transport configuration (FIG. 6). In the miter saw stand configuration, the saw support surface 30 of the table 14 is positioned at a maximum height H1 above the ground, with the table 14 (and saw support surface 30) extending parallel to the base frame 64 (FIG. 1). Each of the legs 42, 44, 46, 48 extends straight down from the table 14 to the base frame 64, such that the legs 42, 44, 46, 48 extend perpendicular to both the saw support surface 30 and the base frame 64. The base frame 64 and the wheels 88 rest on the ground to support the saw stand 10. The connecting frame member 76 includes a first plurality of clips 92 that receive the connecting member 60 to retain the connecting member 60 and the first and second legs 42, 44 in position. In the illustrated embodiment, two clips 92 are provided; however, other quantities or configurations of clips 92 may be used. Alternatively, any other retaining members, such as magnets, hook and loop bands, and the like may be used to couple the connecting member 60 (and thus, the first and second legs 42, 44) to the connecting frame member 76 when the saw stand 10 is in the miter saw stand configuration.

Figure 4:
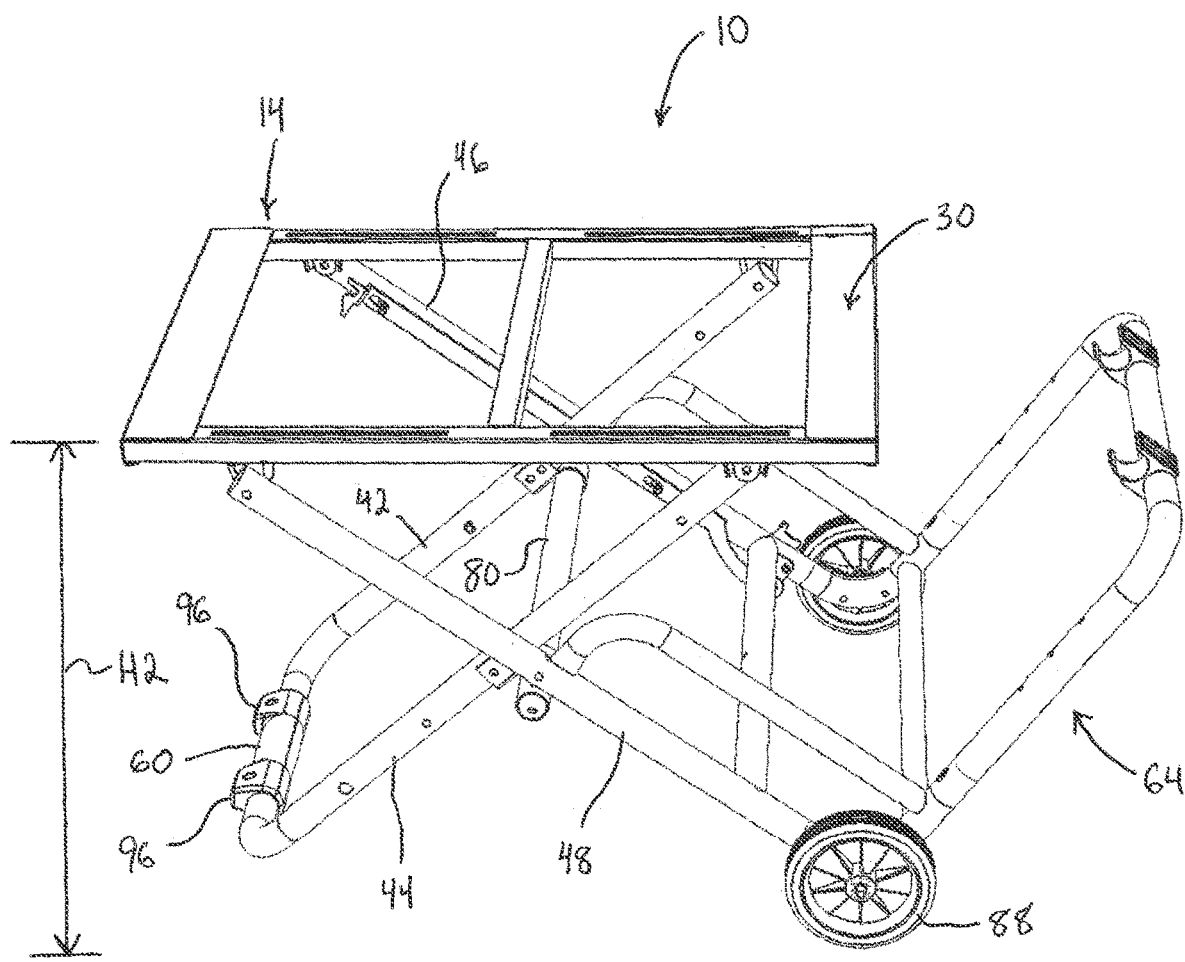
FIG. 4 is another perspective view of the saw stand of FIG. 1 in the table saw stand configuration.

In the table saw stand configuration, the saw support surface 30 is positioned at a lower height H2 above the ground (FIG. 4). In other words, the saw support surface 30 is positioned at a lower height (i.e. closer to the ground) when the saw stand 10 is in the table saw stand configuration than when the saw stand 10 is in the miter saw stand configuration. The table 14 (and saw support surface 30) extends parallel to the ground, and each of the legs 42, 44, 46, 48 is pivoted inward and oriented at an oblique angle relative to the saw support surface 30. The first and second legs 42, 44 cross the third and fourth legs 46, 48 to generally form an X-shape. The wheels 88 and feet 96 on the connecting member 60 rest on the ground to support the saw stand 10. The first and second legs 42, 44 each include a second clip 100 that is hooked onto the cross member 80 to retain the legs 42, 44, 46, 48 in position (FIG. 5). In other embodiments, other quantities or configurations of clips 100 may be used. Alternatively, any other retaining members, such as magnets, hook and loop bands, and the like may be used to couple the first and second legs 42, 44 to the cross member 80 when the saw stand 10 is in the table saw stand configuration.

Figure 7:
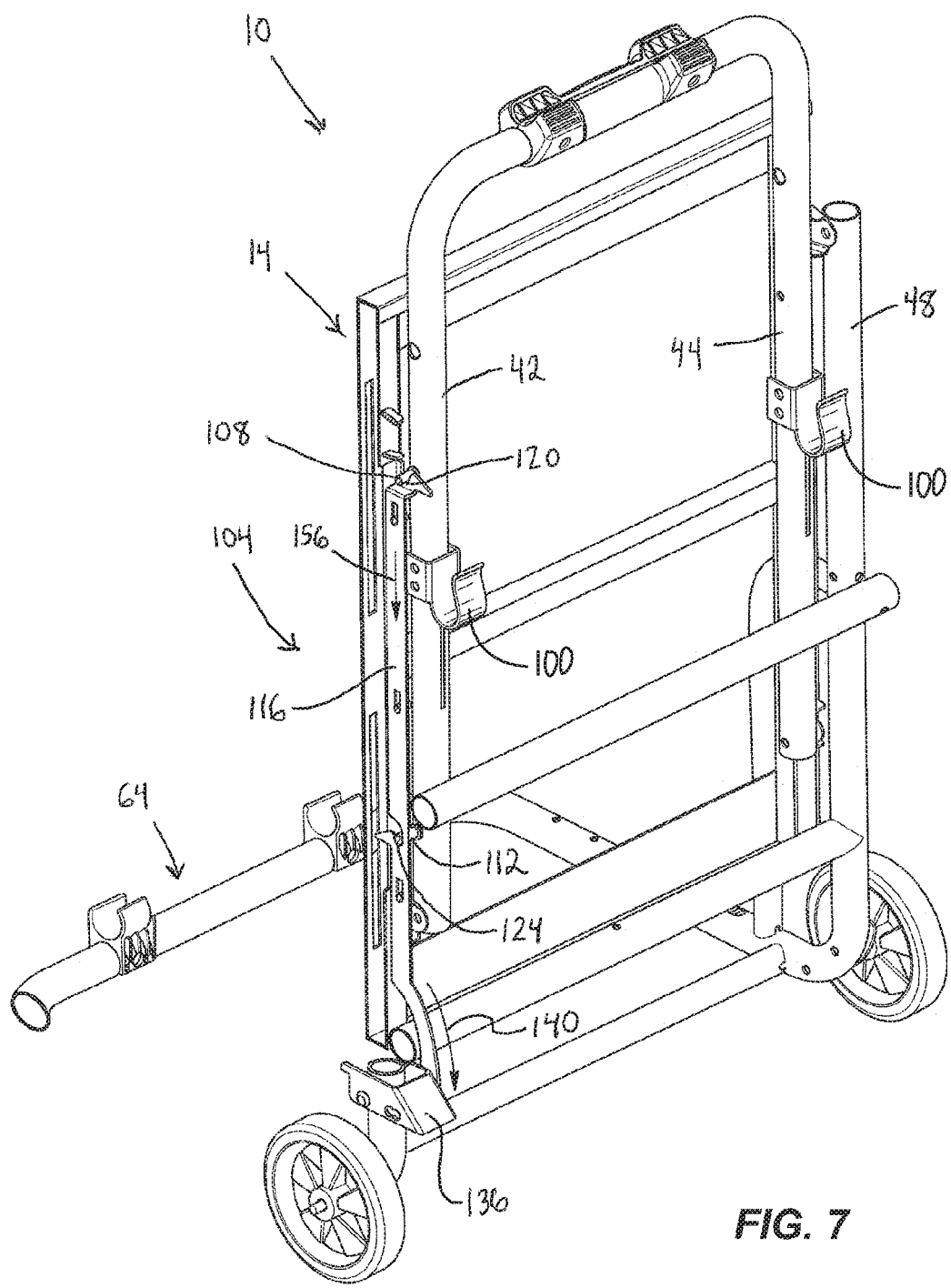
FIG. 7 is a cross-sectional view of the saw stand of FIG. 6, taken along line 7-7 in FIG. 6, illustrating a latch mechanism of the saw stand in a latched position.
Figure 8:
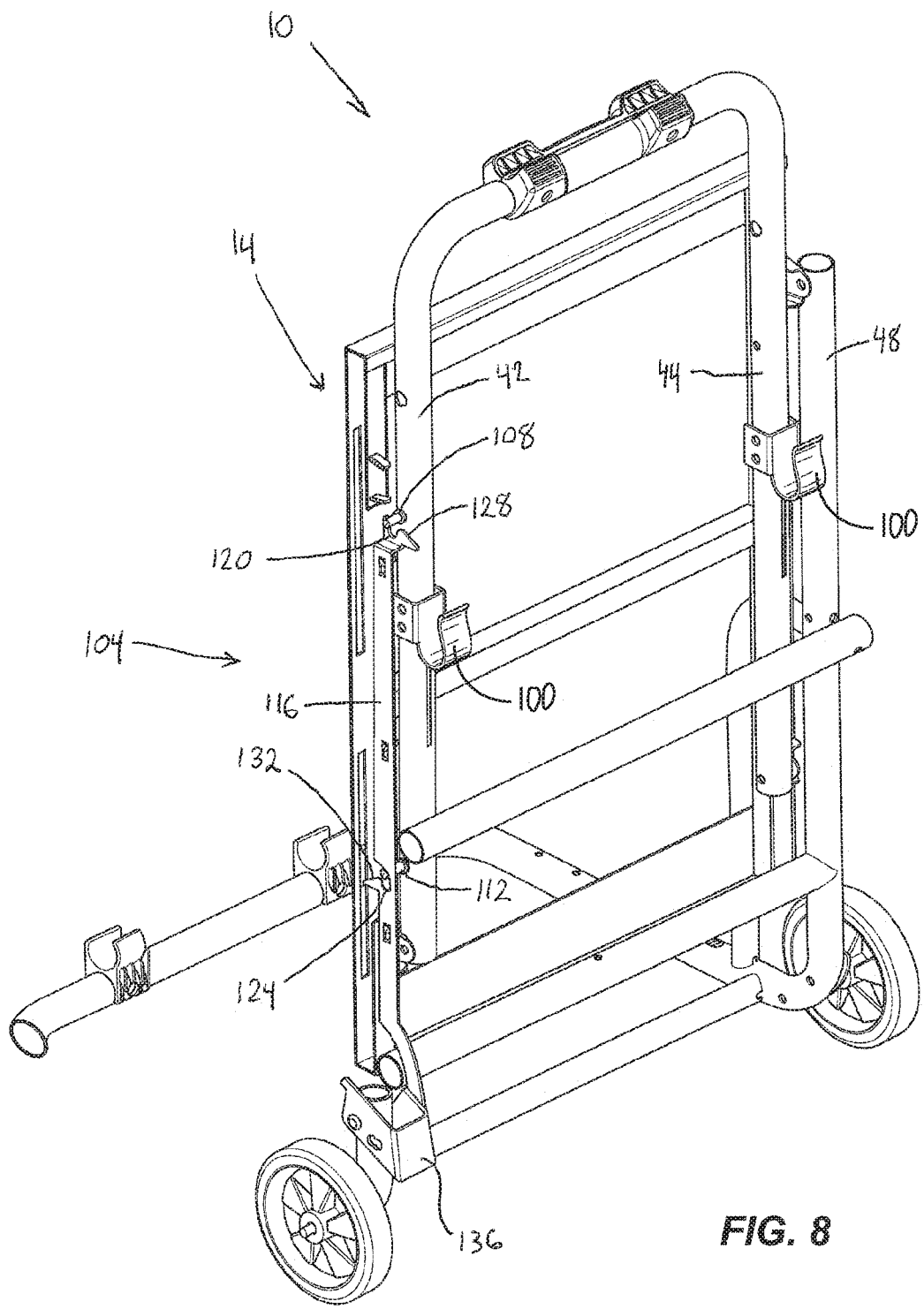
FIG. 8 is a cross-sectional view of the saw stand of FIG. 6, taken along line 7-7 in FIG. 6, illustrating the latch mechanism in an unlatched position.

With reference to FIG. 6, in the transport configuration, each of the legs 42, 44, 46, 48 is pivoted further inward until each of the legs 42, 44, 46, 48 extends parallel to the saw support surface 30 and adjacent to the underside of the table 14. The legs 42, 44, 46, 48 and saw support surface 30 are oriented perpendicular to the base frame 64. The saw stand 10 further includes a latch mechanism 104 that selectively retains the saw stand 10 in the transport configuration (FIGS. 7-8). The latch mechanism 104 includes first and second pins 108, 112 extending laterally from the first leg 42 and spaced apart along the length of the first leg 42. A latch bar 116 is supported by the third leg 46 and is slidable in a length direction of the third leg 46 between a latched position (FIG. 7) and an unlatched position (FIG. 8). Alternatively, the pins 108, 112 may be located on the second leg 44, and the latch bar 116 may be supported by the fourth leg 48.

The illustrated latch bar 116 includes a first groove 120 and a second groove 124. A first cam surface 128 is located adjacent the first groove 120, and a second cam surface 132 is located adjacent the second groove 124 (FIG. 8). When the saw stand 10 is in the transport configuration and the latch bar 116 is in the latched position, the pins 108, 112 are received and held in the respective grooves 120, 124 to retain the first and second legs 42, 44 (and thus, the table 14) against the third and fourth legs 46, 48 (FIG. 7). The latch mechanism 104 further includes an actuator 136 coupled to the latch bar 116. In the illustrated embodiment, the actuator 136 is a pedal pivotally coupled to the base frame 64. The actuator 136 is pivotable in an unlatching direction 140 (e.g., when depressed by a user's foot) to move the latch bar 116 toward the unlatched position, and in an opposite, latching direction to move the latch bar 116 toward the latched position. The latch bar 116 is preferably biased toward the latched position by a coil spring (not shown) coupled to the latch bar 116. In other embodiments, the latch bar 116 may be biased toward the latched position by any other suitable biasing member, such as a torsion spring coupled to the actuator 136.

In operation, a user may set a miter saw on the saw support surface 30 of the table 14 when the saw stand 10 is in the miter saw stand configuration illustrated in FIG. 1. In the miter saw stand configuration, the saw support surface 30 is positioned at its maximum height H1 above the ground, which is preferably a convenient height for operating a miter saw. The saw stand 10 is retained in the miter saw stand configuration by the engagement between the clips 92 and the connecting member 60 that extends between the first and second legs 42, 44.

Figure 2:
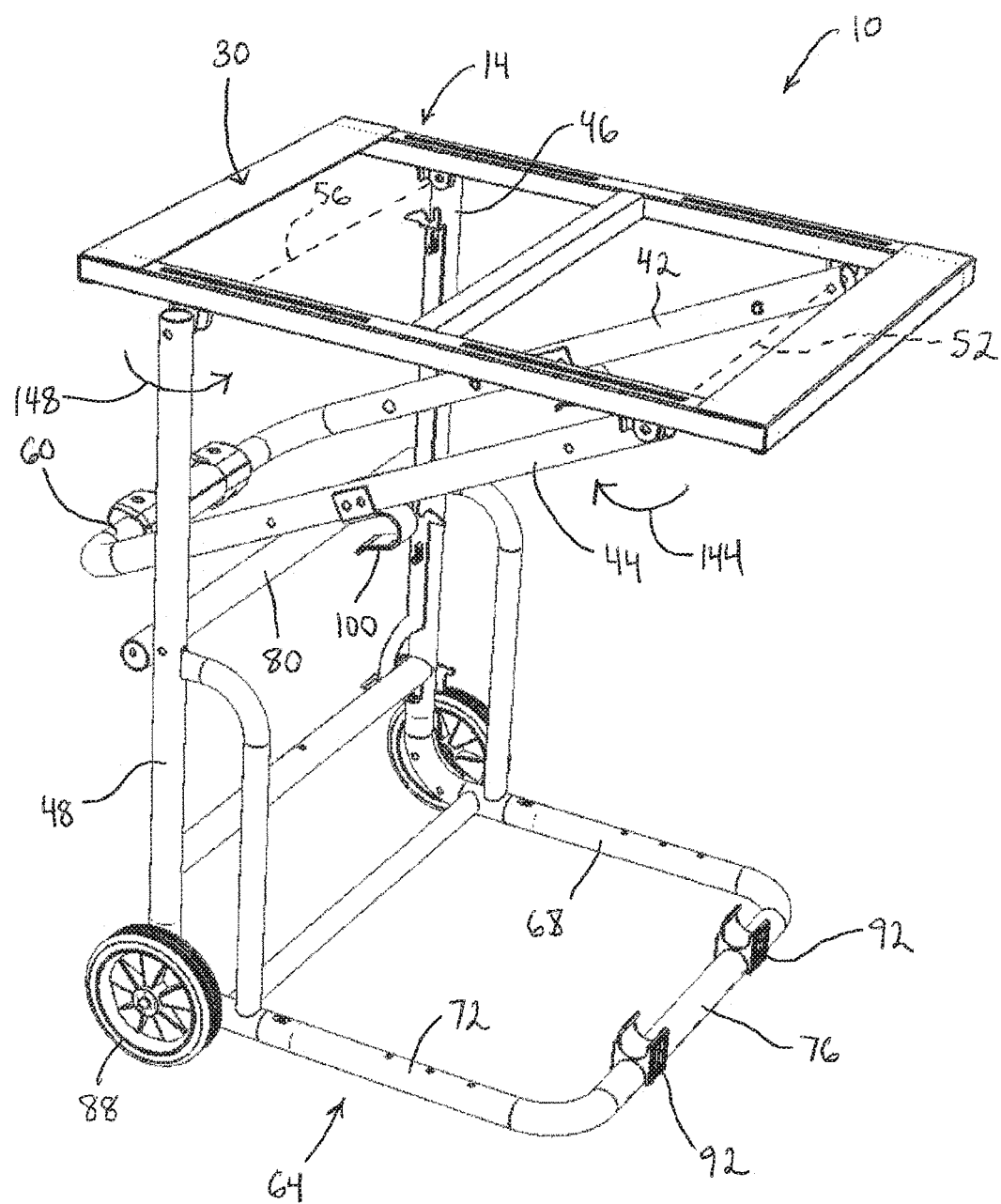
FIG. 2 is a perspective view of the saw stand of FIG. 1 being moved toward a table saw stand configuration.

If the user desires to lower the height of the saw support surface 30 (e.g., in order to user the saw stand 10 to support a portable table saw), the user first pulls the connecting member 60 out of the clips 92, then pivots the first and second legs 42, 44 inwardly toward the underside of the table 14, in the direction of arrow 144 (FIG. 2). The user also pivots the third and fourth legs 46, 48 inwardly toward the underside of the table 14 in the direction of arrow 148 (e.g., by allowing the table 14 to pivot downward toward the legs 46, 48 under the influence of gravity). The user pivots the legs 42, 44, 46, 48 until the legs cross and form an X shape, and the user positions the clips 100 onto the cross member 80 to retain the legs 42, 44, 46, 48 in position (FIG. 3).

Figure 3:
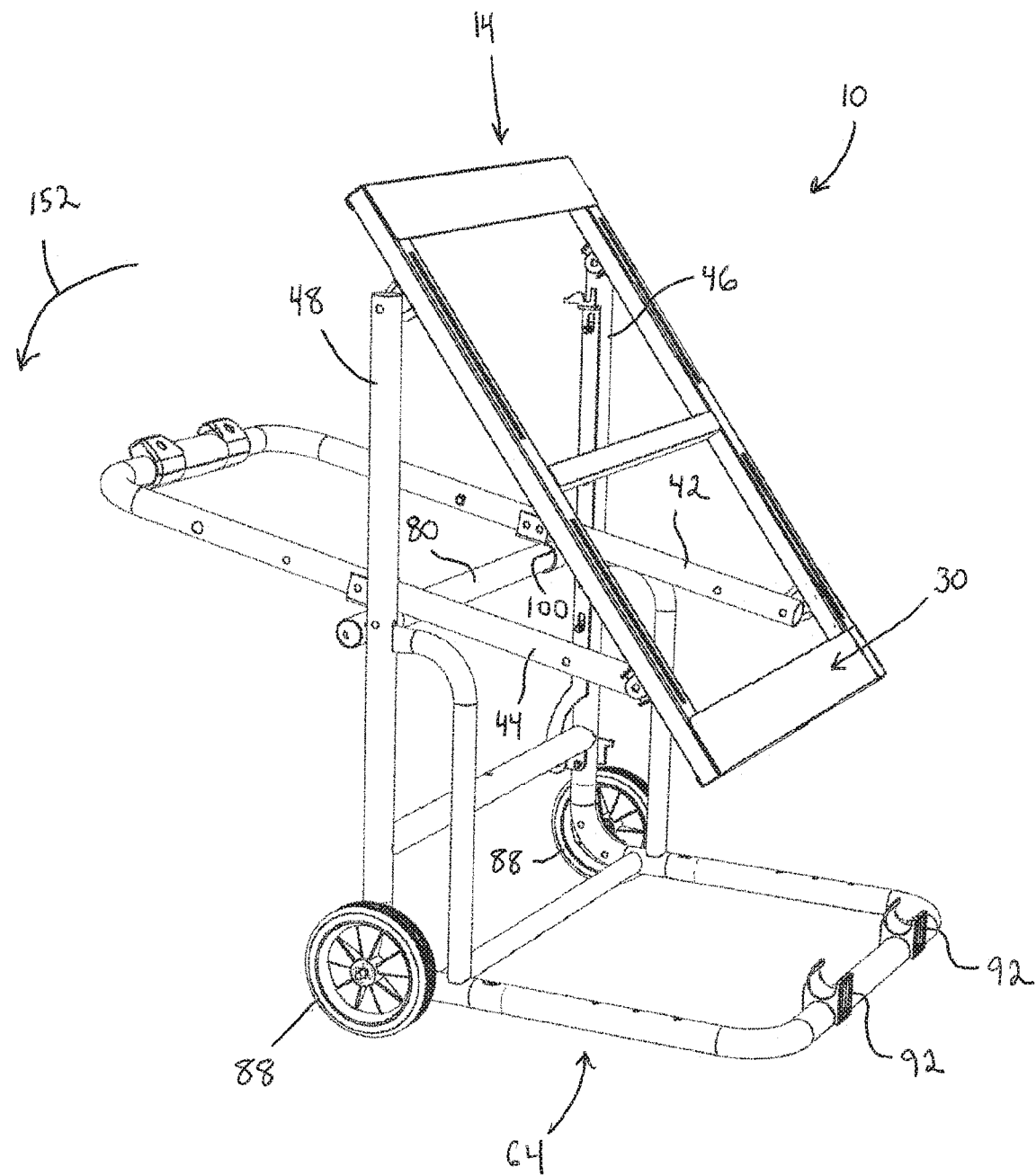
FIG. 3 is a perspective view of the saw stand of FIG. 1 in the table saw stand configuration.

Next, the user tips the entire saw stand 10 in the direction of arrow 152 (FIG. 3). The saw stand 10 may rotate about the wheels 88, for example, to facilitate tipping the saw stand 10 in the direction of arrow 152. The user tips the stand 10 until it comes to rest on feet 96 (FIG. 4). The saw stand 10 is thus configured in the table saw stand configuration, with the saw support surface 30 positioned at its lower height H2 above the ground, which is preferably a convenient height for operating a table saw. The saw stand 10 is retained in the table saw stand configuration by the engagement between the clips 100 and the cross member 80.

When the user desires to transport the saw stand 10, the user disengages the clips 100 from the cross member 80, and further pivots the legs 42, 44, 46, 48 inward until the legs 42, 44, 46, 48 are positioned adjacent the underside of the table 14. Just before reaching the transport configuration illustrated in FIG. 6, the pins 108, 112 on the first leg 42 engage the cam surfaces 128, 132 on the latch bar 116, displacing the latch bar 116 downward in the direction of arrow 156 (FIG. 7). Upon clearing the crests of the cam surfaces 128, 132, the latch bar 116 is moved upward (e.g., under the influence of a biasing member) to lock the pins 108, 112 into the grooves 120, 124. The latch mechanism 104 thus retains the saw stand 10 in the transport configuration.

Referring to FIG. 6, when the saw stand 10 is in the transport configuration, it is configured as a hand truck. The saw support surface 30 is oriented perpendicular to the base frame 64, and the saw support surface 30 and base frame 64 can conveniently support items (such as a saw or other tools). The connecting member 60 can be grasped by a user to tilt the saw stand 10 and maneuver the saw stand 10 on the wheels 88.

To adjust the saw stand 10 back to either the miter saw stand configuration or the table saw stand configuration, the user first depresses the actuator 136 in the direction of arrow 140 (FIG. 7). This moves the latch bar 116 downward in the direction of arrow 156, which releases the pins 108, 112 from the grooves 120, 124. The legs 42, 44, 46, 48 are then free to pivot away from the underside of the table 14 to either of the positions described above.

FIGS. 9-13 illustrate a saw stand 210 according to another embodiment of the invention. The saw stand 210 is similar to the saw stand 10 described above with reference to FIGS. 1-8. Accordingly, the following description focuses primarily on differences between the saw stand 210 and the saw stand 10. In addition, features and elements of the saw stand 210 corresponding with features and elements of the saw stand 10 are given like reference numbers plus '200.'

Figure 9:
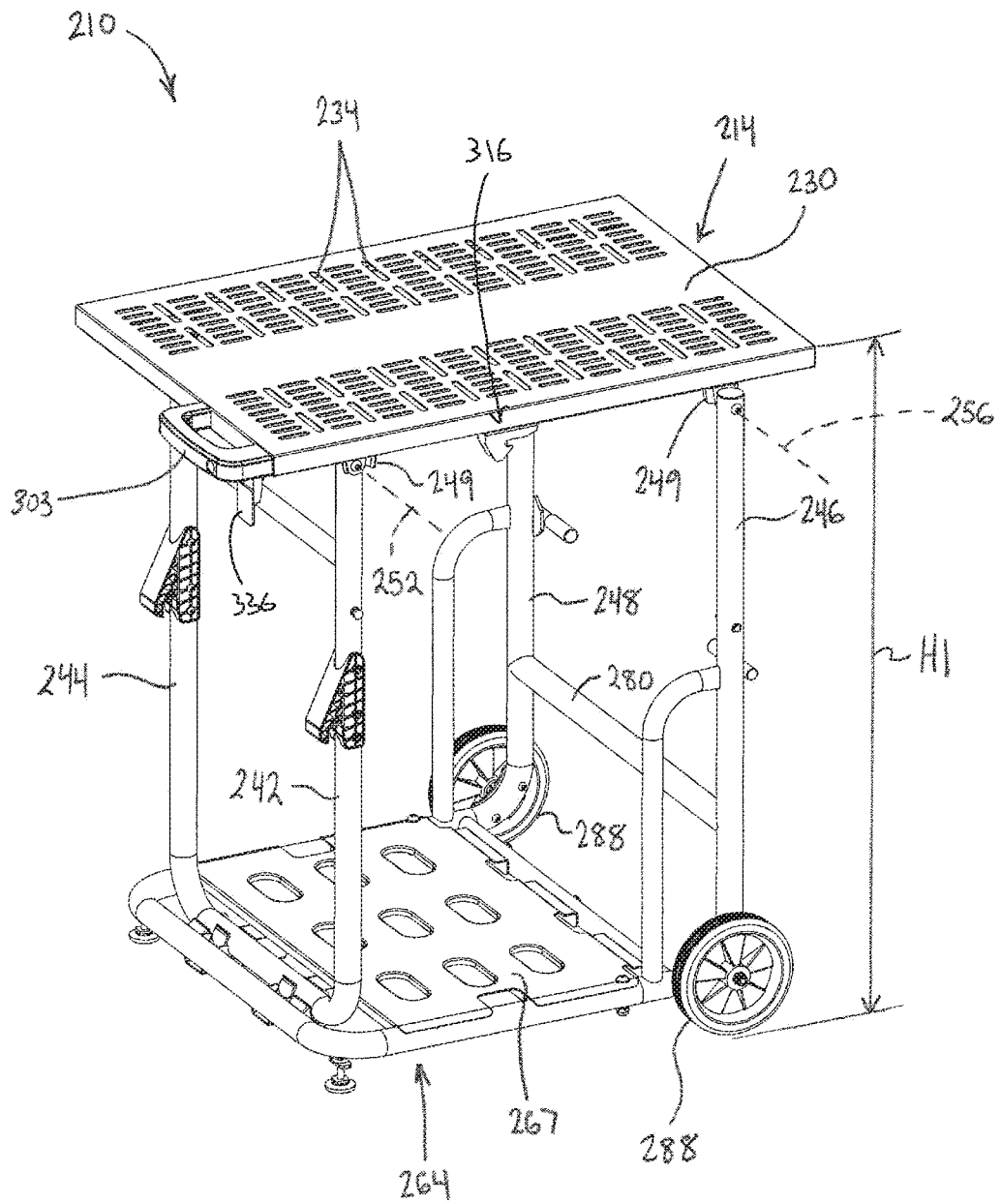
FIG. 9 is a perspective view of a saw stand according to another embodiment, positioned in a miter saw stand configuration.

With reference to FIG. 9, the saw stand 210 includes a table 214 defining a generally planar saw support surface 230 particularly sized and shaped for supporting a saw thereon. For example, in the illustrated embodiment, the saw support surface 230 is sized and shaped to support standard sized miter saws and portable table saws. The illustrated table 214 includes an array of slots 234 that can receive fasteners to securely couple a particular saw to the table 214.

With continued reference to FIG. 9, the saw stand 210 further includes first, second, third, and fourth legs, 242, 244, 246, 248, each pivotally coupled to a respective bracket 249 on the underside of the table 214. As such, the first and second legs 242, 244 are pivotable relative to the table 214 about a first axis 252, and the third and fourth legs 246, 248 are pivotable relative to the table 214 about a second axis 256 that is parallel to the first axis 252. A base frame 264 is coupled the third and fourth legs 246, 248, and a platform 267 extends across the base frame 264. In the illustrated embodiment, the saw stand 210 further includes a cross member 280. The cross member 280 extends between the third and fourth legs 246, 248. A pair of wheels 288 is coupled to the base frame 264 or the legs 246, 248 proximate the distal (i.e. remote from the table 214) ends of the third and fourth legs 246, 248.

Figure 10:
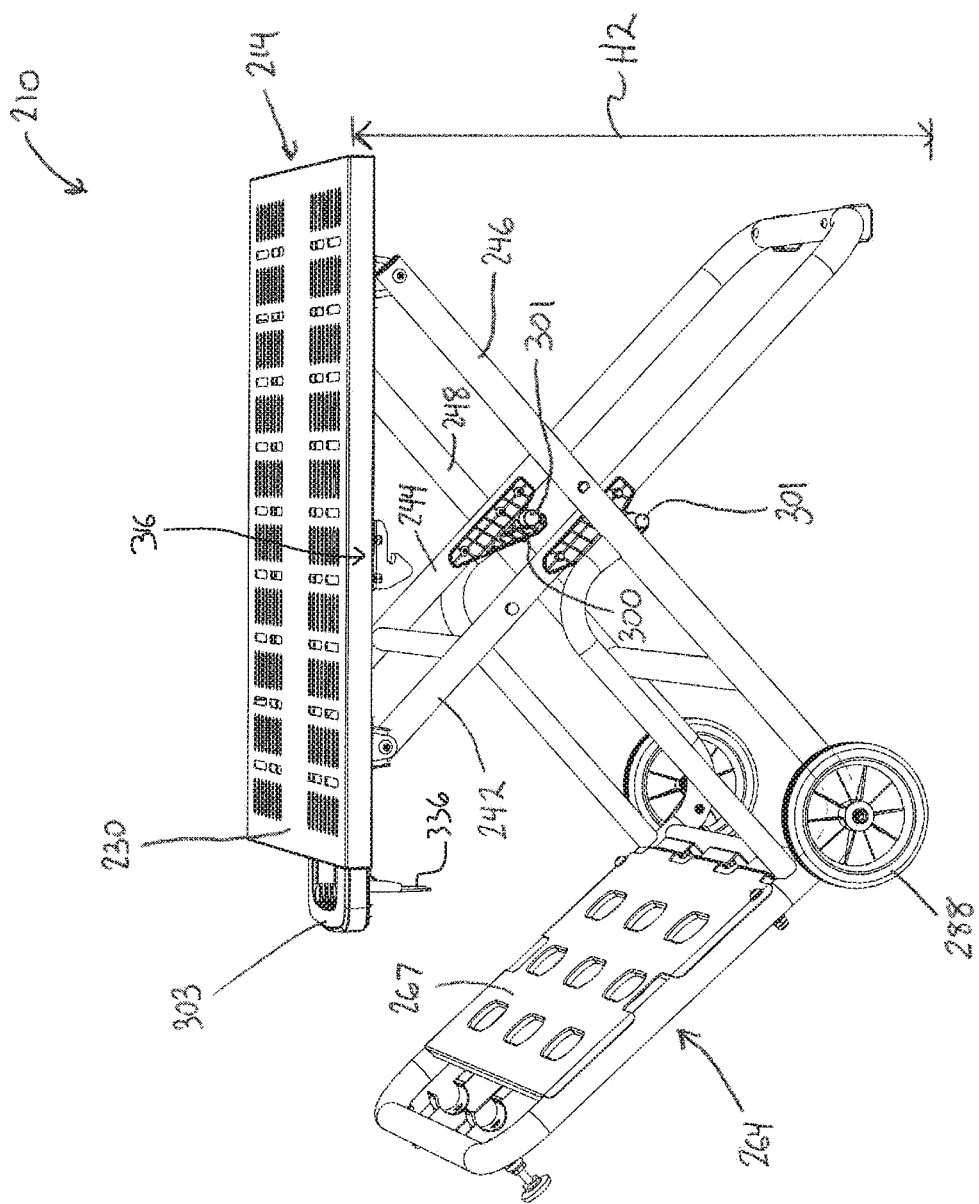
FIG. 10 is a perspective view of the saw stand of FIG. 9 positioned in a table saw stand configuration.
Figure 11:
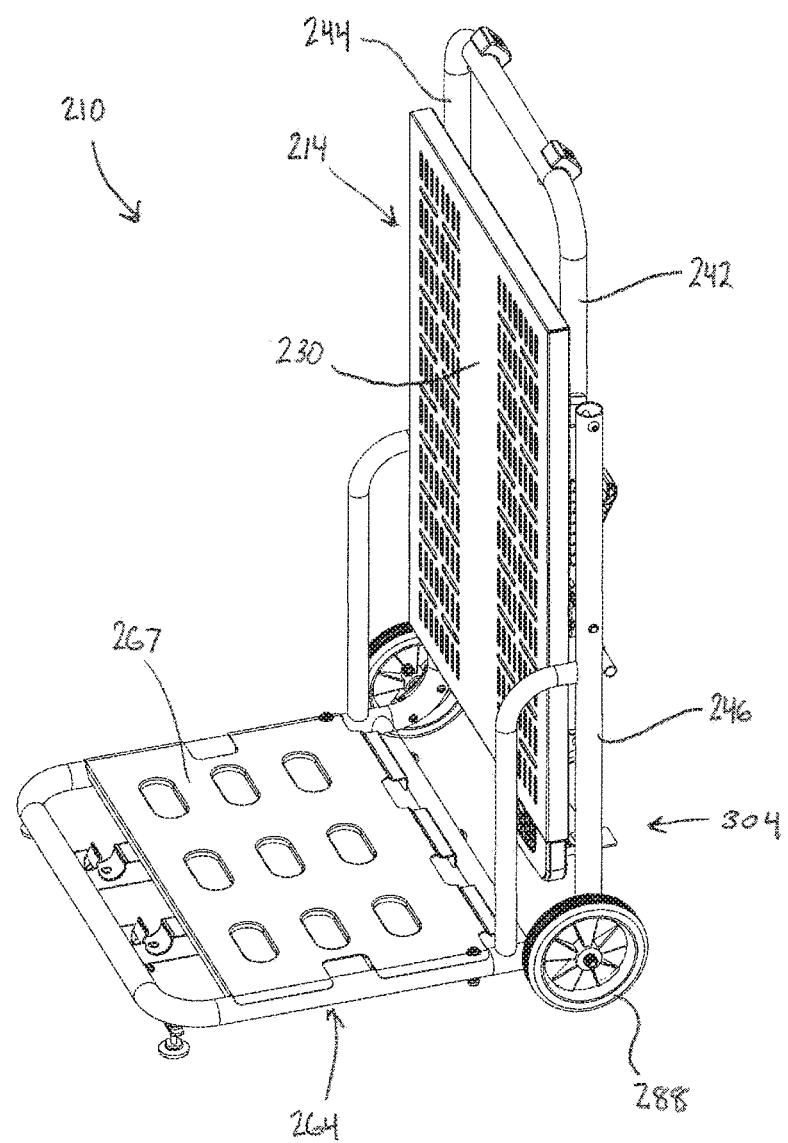
FIG. 11 is a perspective view of the saw stand of FIG. 9 positioned in a transport configuration.

Like the saw stand 10, the illustrated saw stand 210 is configurable in a first or miter saw stand configuration (FIG. 9), a second or table saw configuration (FIG. 10), and a third or transport configuration (FIG. 11). In the miter saw stand configuration, the saw support surface 230 of the table 214 is positioned at a maximum height H1 above the ground. Each of the legs 242, 244, 246, 248 extends straight down from the table 214 to the base frame 264, such that the legs 242, 244, 246, 248 extend perpendicular to both the saw support surface 230 and the base frame 264.

In the table saw stand configuration, the saw support surface 230 is positioned at a lower height H2 above the ground (FIG. 10). The table 214 (and saw support surface 230) extends parallel to the ground, and each of the legs 242, 244, 246, 248 is pivoted inward and oriented at an oblique angle relative to the saw support surface 230. The first and second legs 242, 244 cross the third and fourth legs 246, 248 to generally form an X-shape. The first and second legs 242, 244 each include a clip 300 that is hooked onto a corresponding post 301 fixed to each of the third and fourth legs 246, 248 to retain the legs 242, 244, 246, 248 in position (FIG. 5).

With reference to FIG. 11, in the transport configuration, each of the legs 242, 244, 246, 248 is pivoted further inward until each of the legs 242, 244, 246, 248 extends parallel to the saw support surface 230 and adjacent to the underside of the table 214. The legs 242, 244, 246, 248 and saw support surface 230 are oriented perpendicular to the base frame 264.

Figure 12:
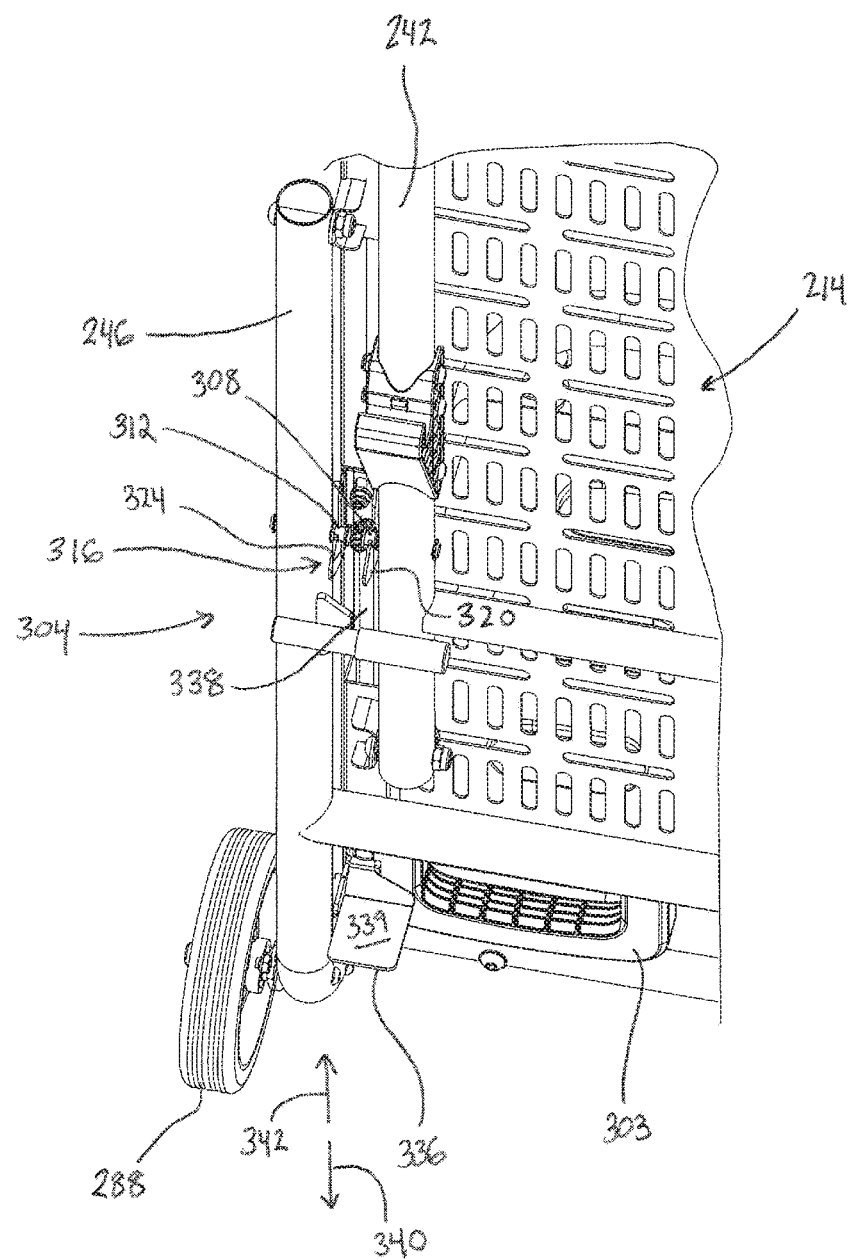
FIG. 12 is a perspective view of a portion of the saw stand of FIG. 9, illustrating a latch mechanism of the saw stand in a latched position.
Figure 13:
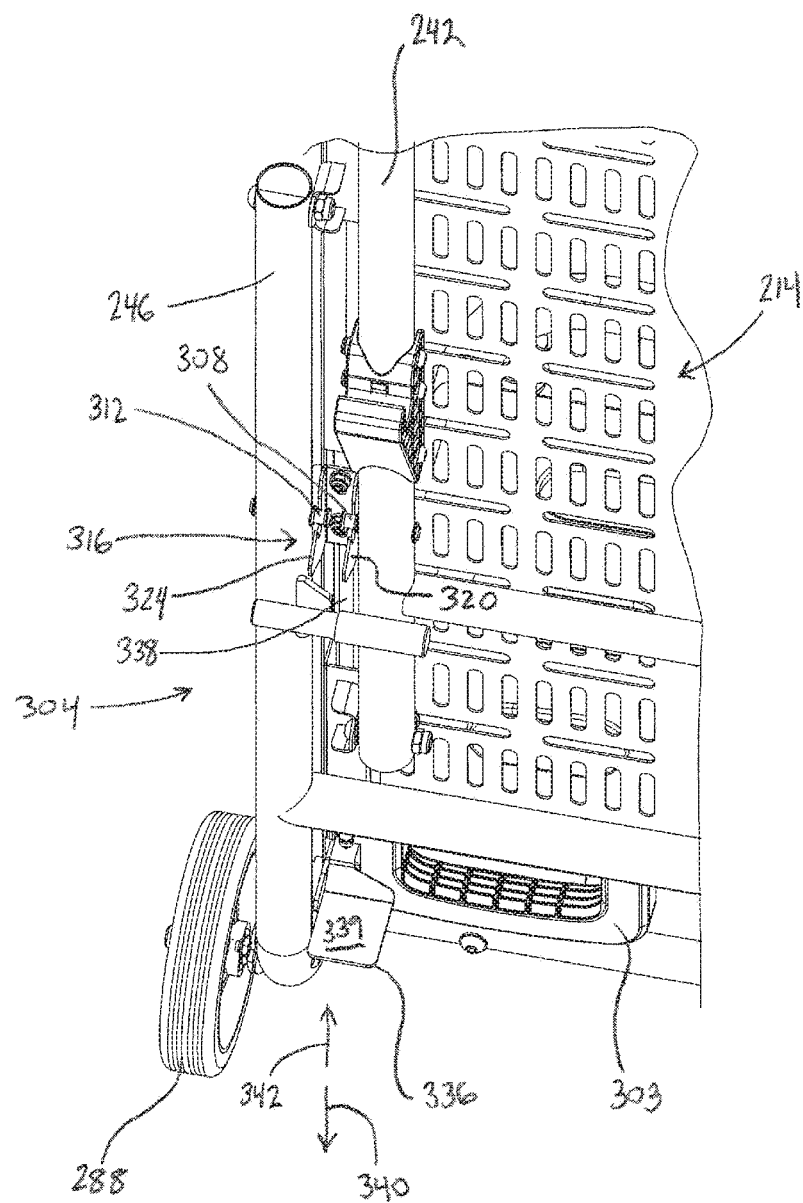
FIG. 13 is a perspective view of a portion of the saw stand of FIG. 9, illustrating the latch mechanism in an unlatched position.

The saw stand 210 further includes a generally U-shaped handle 303 extending from the table 214 in a direction parallel to the saw support surface 230 (FIGS. 9-10). The handle 303 may be grasped by a user to facilitate moving the saw stand 210 along the ground (e.g., by rolling the saw stand 210 on the wheels 288). The illustrated saw stand also includes a latch mechanism 304 that selectively retains the saw stand 210 in the transport configuration (FIGS. 11-13). The latch mechanism 304 includes first and second pins 308, 312 extending laterally from the first leg 242 and the third leg 246, respectively, and a latch element 316 supported by the table 214 and slidable between a latched position (FIG. 12) and an unlatched position (FIG. 13). The latch element 316 has a first hook 320 and a second hook 324. The first hook 320 is engageable with the first pin 308 and the second hook 324 is engageable with the second pin 312 when the latch element 316 is in the latched position. This retains the first and third legs 242, 246 against the underside of the table 214 and therefore also retains the second and fourth legs 244, 248 against the underside of the table 214 due to the respective pairs of legs 242, 244, 246, 248 being interconnected. Accordingly, the latch mechanism 304 can retain the saw stand 210 in the third configuration.

The latch mechanism 304 further includes an actuator 336 coupled to the latch element 316 via a rod 338. In the illustrated embodiment, the actuator 336 has a planar surface 339 that allows the actuator 336 to be actuated by a user's foot. The actuator 336 (together with the rod 338 and the latch element 316) is slidable in an unlatching direction 340 (e.g., when the actuator 336 is depressed by a user's foot) to move the latch element 316 toward the unlatched position, and in an opposite, latching direction 342 to move the latch element 316 toward the latched position. The latch element 316 is preferably biased toward the latched position by a coil spring (not shown).

In operation, when the saw stand 210 is in the transport configuration, it is configured as a hand truck. The saw support surface 230 is oriented perpendicular to the base frame 264, and the saw support surface 230 and the platform 267 can conveniently support items (such as a saw or other tools). The user may tilt the saw stand 210 and maneuver the saw stand 210 on the wheels 288. To adjust the saw stand 10 to either the miter saw stand configuration (FIG. 9) or the table saw stand configuration (FIG. 10), the user first depresses the actuator 336 in the direction of arrow 340. This moves the latch element 316 downward in the unlatching direction 340, which releases the pins 308, 312 from the hooks 320, 324. The legs 242, 244, 246, 248 are then free to pivot away from the underside of the table 214 to either of the positions described above. The latch mechanism 304 advantageously allows the user to unlatch the saw stand 210 from the transport configuration with a single action.

Various features of the invention are set forth in the following claims.

What is claimed is:

1. A saw stand comprising:
   a table having a saw support surface;
   a plurality of legs pivotally coupled to the table, the legs movable relative to the table to define a first configuration, a second configuration, and a third configuration of the saw stand, wherein the plurality of legs includes a first leg and a second leg, each pivotable about a first axis, and wherein the plurality of legs further includes a third leg and a fourth leg, each pivotable about a second axis parallel to the first axis; and
   a latch mechanism including a latch element movable between a latched position and an unlatched position, wherein the latch mechanism is configured to inhibit movement of each of the legs relative to the table when the latch element is in the latched position and the saw stand is in the third configuration.

2. The saw stand of claim 1, wherein the saw support surface is positioned at a first height when the saw stand is in the first configuration, and wherein the saw support surface is positioned at a second height less than the first height when the saw stand is in the second configuration.

3. The saw stand of claim 2, wherein each of the legs extends parallel to the saw support surface when the saw stand is in the third configuration.

4. The saw stand of claim 3, wherein the saw stand is configured as a hand truck in the third configuration.

5. The saw stand of claim 1, wherein the latch mechanism includes a first pin extending from the first leg and a second pin extending from the third leg, and wherein the latch element includes a first hook engageable with the first pin and a second hook engageable with the second pin.

6. The saw stand of claim 1, wherein the first and second legs extend parallel to the third and fourth legs when the saw stand is in the first configuration.

7. The saw stand of claim 6, wherein the first and second legs cross the third and fourth legs when the saw stand is in the second configuration.

8. The saw stand of claim 1, further comprising
   a base frame coupled to the third and fourth legs;
   a platform supported on the base frame; and
   a plurality of wheels coupled to the base frame or the third and fourth legs.

9. The saw stand of claim 1, further comprising a post extending from each of the third leg and the fourth leg, wherein clips on each of the first and second legs are engageable with the posts when the saw stand is in the second configuration to retain the saw stand in the second configuration.

10. A saw stand comprising:
    a table having a saw support surface;
    a plurality of legs pivotally coupled to the table, the legs pivotable relative to the table to define a first configuration in which the legs extend perpendicular to the saw support surface, a second configuration in which the legs extend at oblique angles relative to the saw support surface, and a third configuration in which the legs extend parallel to the saw support surface; and
    a latch mechanism including a latch element movable between a latched position and an unlatched position, wherein the latch mechanism is configured to inhibit movement of each of the legs relative to the table when the latch element is in the latched position and the saw stand is in the third configuration.

11. The saw stand of claim 10, wherein movement of the latch element from the latched position to the unlatched position releases each of the legs for pivotal movement toward the first configuration or the second configuration.

12. The saw stand of claim 10, wherein the saw support surface is positioned at a first height when the saw stand is in the first configuration, and wherein the saw support surface is positioned at a second height less than the first height when the saw stand is in the second configuration.

13. The saw stand of claim 10, wherein the saw stand is configured as a hand truck when the saw stand is in the third configuration.

14. The saw stand of claim 10, wherein the plurality of legs includes a first leg and a second leg, each pivotable about a first axis, and wherein the plurality of legs further includes a third leg and a fourth leg, each pivotable about a second axis parallel to the first axis.

15. The saw stand of claim 14, wherein the first and second legs cross the third and fourth legs when the saw stand is in the second configuration.

16. A saw stand comprising:
    a table having a saw support surface;

a plurality of legs pivotally coupled to the table, the plurality of legs including a first leg and a second leg, each pivotable about a first axis, and the plurality of legs further including a third leg and a fourth leg, each pivotable about a second axis parallel to the first axis;

a base frame extending from the third and fourth legs;

a plurality of wheels coupled to the base frame or the third and fourth legs; and a latch mechanism including a latch element movable along the table, a first pin extending from the first leg, and a second pin extending from the third leg, wherein the saw stand is configurable in a first configuration in which the saw support surface is positioned at a first height, wherein the saw stand is configurable in a second configuration in which the saw support surface is positioned at a second height lower than the first height, wherein the saw stand is configurable in a third configuration in which the saw support surface extends perpendicular to the base frame, and wherein the latch element is engageable with the first pin and the second pin to selectively retain the saw stand in the third configuration.

17. The saw stand of claim 16, wherein the saw stand is configured as a hand truck in the third configuration.

18. The saw stand of claim 16, wherein the latch mechanism includes an actuator and a rod extending along the table interconnecting the latch element with the actuator.

19. The saw stand of claim 18, wherein the actuator is configured as a foot pedal when the saw stand is in the third configuration.

* * * * *